United States Patent
Norfleet

(10) Patent No.: US 7,309,094 B2
(45) Date of Patent: Dec. 18, 2007

(54) UTILITY TRAILER TAILGATE ARRANGEMENT

(75) Inventor: Ralph Norfleet, Somerset, KY (US)

(73) Assignee: Backsaver International, Inc., Somerset, KY (US)

( * ) Notice: Subject to any disclaimer, the term of this patent is extended or adjusted under 35 U.S.C. 154(b) by 0 days.

(21) Appl. No.: 11/050,189

(22) Filed: Feb. 3, 2005

(65) Prior Publication Data

US 2005/0127702 A1   Jun. 16, 2005

Related U.S. Application Data

(63) Continuation of application No. 10/402,398, filed on Mar. 28, 2003, now abandoned.

(51) Int. Cl.
*B62D 25/00* (2006.01)

(52) U.S. Cl. .................................. 296/57.1; 296/61

(58) Field of Classification Search .................. 296/50, 296/61, 57.1; 414/537
See application file for complete search history.

(56) References Cited

U.S. PATENT DOCUMENTS

| | | | |
|---|---|---|---|
| 2,184,814 A | * | 12/1939 | Nagamatsu |
| 3,009,732 A | | 11/1961 | Brown |
| 4,887,393 A | | 12/1989 | Cysewski |
| 5,954,383 A | | 9/1999 | Beck et al. |
| 6,126,223 A | | 10/2000 | Rayburn |
| 6,183,031 B1 | | 2/2001 | Ballard et al. |
| 6,196,609 B1 | | 3/2001 | Bowers |
| 6,267,429 B1 | | 7/2001 | Kuzmich |
| 6,450,559 B1 | | 9/2002 | Renke |
| 6,485,004 B1 | | 11/2002 | Licata et al. |
| 6,550,840 B2 | | 4/2003 | Rayburn |

FOREIGN PATENT DOCUMENTS

| GB | 510464 | 8/1939 |
|---|---|---|
| GB | 690940 | 4/1953 |
| JP | 63-17113 | 1/1988 |

OTHER PUBLICATIONS

"Tailgate Lift Assistant US Patent #6,183,031" Instructions, no date provided.
Tesh & Son's Inc. "New""Finger Lift Spring Assist Gate," Trailer Hitch & Trailer Manufacturing, teshandsons.com, Feb. 26, 2002.

* cited by examiner

*Primary Examiner*—Stephen Gordon
(74) *Attorney, Agent, or Firm*—King & Schickli, PLLC

(57) ABSTRACT

A lift assembly assists in raising or lowering a tailgate, such as one found on a utility trailer. In one embodiment, a housing extends in a longitudinal direction with an end wall having an opening adjacent the tailgate. A spring is positioned within the housing. A cable extends between the spring and the tailgate, including through the opening in the end wall. An insert receives the cable passing through the opening, and is securely retained by the end wall and prevented from moving freely in the longitudinal direction as the cable moves to and fro during raising and lowering of the tailgate.

17 Claims, 4 Drawing Sheets

UTILITY TRAILER TAILGATE ARRANGEMENT

This is a continuation of U.S. patent application Ser. No. 10/402,398, now abandoned, the disclosure of which is incorporated herein by reference.

BACKGROUND OF THE INVENTION

1. Field of the Invention

The present invention relates to tailgate lift assemblies and more particularly to arrangements which permit a heavy tailgate which is hingedly attached to a utility trailer, to be raised and lowered with reduced effort due to the assistance of the lift assembly.

2. Prior Art

Utility trailers are common everywhere and are utilized to carry small equipment, construction goods and contractors implements. They consist of a flat bed with or without side rails or walls extending upwardly along the side to about 36 inches high. These utility trailers particularly have one or two sets of wheels and are pulled behind a large car or pickup truck. Utility trailers have a hinged gate or ramp at their rearward end to allow the loading and unloading of those supplies, goods or implements. Those gates or ramps are typically made of steel and have to be somewhat long to provide a relatively safe slope on which to load that trailer. Those gates therefore are typically also very heavy. Tailgate lift assemblies have been on the market and have been adapted to fit on to the beds or side rails of those utility trailers.

Examples of such add-on assemblies are shown for example, in U.S. Pat. No. 6,126,223, which prior art assemblies may utilize an expensive and foulable set of rollers on its distalmost end to guide a cable to the ramp or gate from the side rail arrangement on the utility trailer. Such roller assemblies are an expensive part of the assembly, they can be fouled by dirt, wear or by a lose cable and are susceptible to malfunction.

It is an object of the present invention to overcome the disadvantages of the prior art.

It is a further object of the present invention to provide a tailgate assist assembly which is easy to change, replace and utilize in an economical and safe manner.

BRIEF SUMMARY OF THE INVENTION

The present invention comprises a tailgate lift assembly arranged on the bed or side rails or walls of a utility tailer. A utility trailer, by definition, has a flat bed, at least one set of wheels, and a dropdown tailgate having a hinge attached to the back end of the flatbed, which is tiltable into an upward orientation. The utility trailer is typically pulled by a large vehicle such as a pickup truck or the like. The side rails of the utility trailer are typically no higher than about 36" high from the flatbed of that trailer.

The tailgate lift assembly of the present invention comprises an elongated housing having a forward end and a rearward end. At least one elongated coiled spring is arranged within that elongated housing. The elongated spring has a forward end which is fixedly secured to the forward end of the elongated housing. The elongated spring has rearward end which is attached to the forward end of a flexible cable. The flexible cable has a rearward end which is attached to the pivotable tailgate which is attached to the rearward end of the utility trailer.

The rearward end of the elongated housing has a side-reinforced back wall with a cable-encircling guide member arranged and removably supported therewithin. The guide member of the present invention comprises a generally circumferentially disposed insert or grommet made from a smooth, slippery or lubricious material such as for example, teflon, nylon, copper or the like. The annular grommet is supported within an opening in the reinforced back wall of the elongated housing. The cable extends through a bore of the grommet, the cable's rearward end being attached to a connective link on the tailgate to permit articulation between the cable and the tailgate as the tailgate is moved from a generally horizontal or lowermost orientation to a vertical orientation with respect to the rear end of the utility trailer.

In a first preferred embodiment of the elongated housing, such elongated housing may be made by an extrusion process. The wall of the housing may be of plastic, fiberglass or of metal of various lengths. The rearward end of the housing may have a wall member extending perpendicular to the longitudinal axis of that housing. A central opening extends through the rear wall member which receives the insert or grommet therethrough. The rear end of the housing preferably may comprise a pair of sloped sidewalls arranged adjacent the side of the rear wall to provide a rearwardly reinforced enclosure for the sides of the wall supporting the insert to permit ease of mounting to a trailer.

The insert is preferably of generally cylindrical configuration having a central bore therethrough and curved upstream and a curved rearward end to minimize wearing of the cable as it goes through its arcuate motion when the gate is lifted upwardly or downwardly. The insert preferably has an annular channel which receives the wall portion of the opening of the rear wall of the elongated housing. Replacement of a worn or broken insert is easily accomplished by a simple removal and pressed reinsertion of a new insert into the hole in the rear end wall of the elongated housing.

A further embodiment of the replacement guide member insert comprises a generally square circular or rectilinearly-shaped member having a bore or a U-shaped channel extending longitudinally therethrough. The rearwardmost side of the grommet adjacent the bore has an arcuate curve or scive therearound. An upper portion of the rearmost side of the insert has an insertable component which mates into the U-shaped channel. The insertable component has a tapered or scived edge which is in circumferential alignment with the scived edge of the rearward face of the replacement insert. After installation of a cable through the longitudinal channel, the insertable component may be pressed into engagement with the rear face of the reinstallation insert. The re-installation insert may then itself be inserted into the opening in the rear wall at the rearward end of the elongated housing, or inserted at the rear end of the housing inplace of the rear wall. Such an arrangement of assemblable and insertable components permits ready replacement of the cable within that insert alignment arrangement without necessarily disassembling the chain or the pivotable components at the rearwardmost end of the cable.

A further embodiment of the present invention contemplates the rearward end of flexible cable being attached to the rearwardmost half portion of the pivotable tailgate. The tailgate itself would be hingedly transversely divided and have a hinge at a location closer to the hinge to which it is attached to the utility trailer so that when the tailgate is moved into its vertical or upright orientation, the rearward or distalmost half of the tailgate or ramp may be pivoted and folded about its midpoint hinge to minimize wind resistance and increase visibility rearward of the trailer by the folding of that backward half of the ramp or tailgate against the forward half of the tailgate while still having the cable pulling against the now folded gate against the rearward end of the side rails on the utility trailer.

Thus what has been shown is a unique tailgate lift assembly which permits an inexpensive exchange of components in a facile manner while permitting safe usage of that tailgate assembly on a utility trailer. The present invention also eliminates the need for disassembly of the elongated cable at one or both ends and permits it to still be attached at both ends to thus maintain its attachment to the tailgate or ramp while the guide means at the rearward end of the elongated housing is replaced.

The invention thus comprises a tailgate lift assist arrangement for a utility trailer without a siderail or having a siderail extending upwardly from at least one side of a flatbed, and a tailgate being hingedly attached to a rear end of the flatbed. The lift assist arrangement comprises an elongated housing arranged on an upper portion of the siderail; and a spring attached to a forward end of the housing, the spring having a rearward end attached to a forward end of a flexible cable, the flexible cable having a rearward end movably secured to the tailgate.

The cable is supported in a rearward end of the housing by a stationary cable insert or guide member captured in or replacing a back transverse wall of the elongated housing. The cable insert or guide member may be comprised of a smooth, slippery or lubricious material circumferentially enclosed in an opening in the back wall of the housing or replace that back wall of the housing. The guide member may have an insertable portion which is removable with respect to the member, to enable receipt of the cable therein without disassembly of further cable components thereof. The lubricious insert may have a bore therethrough with a curved surface on each end thereof. The insert may have a channel disposed circumferentially around for receipt of edge portions of the opening in the back wall of the elongated housing. The elongated housing may comprise an extrusion. The back wall may be secured to a pair of triangularly shaped reinforcement walls for strengthening the guide member support. The tailgate may have a rearward portion and a forward portion connected together by a transversely disposed hinge. The rearward end of the cable may be attached to the rearward portion of the tailgate. The elongated housing may also be built into the siderail as a unitary part thereof, instead of being attached to an upper portion of a siderail as an add-on, to streamline the trailer and minimize assembly costs.

BRIEF DESCRIPTION OF THE DRAWINGS

The objects and advantages of the present invention will become more apparent when viewed in conjunction with the following drawings, in which.

DETAILED DESCRIPTION OF THE PREFERRED EMBODIMENTS

Figure 1:
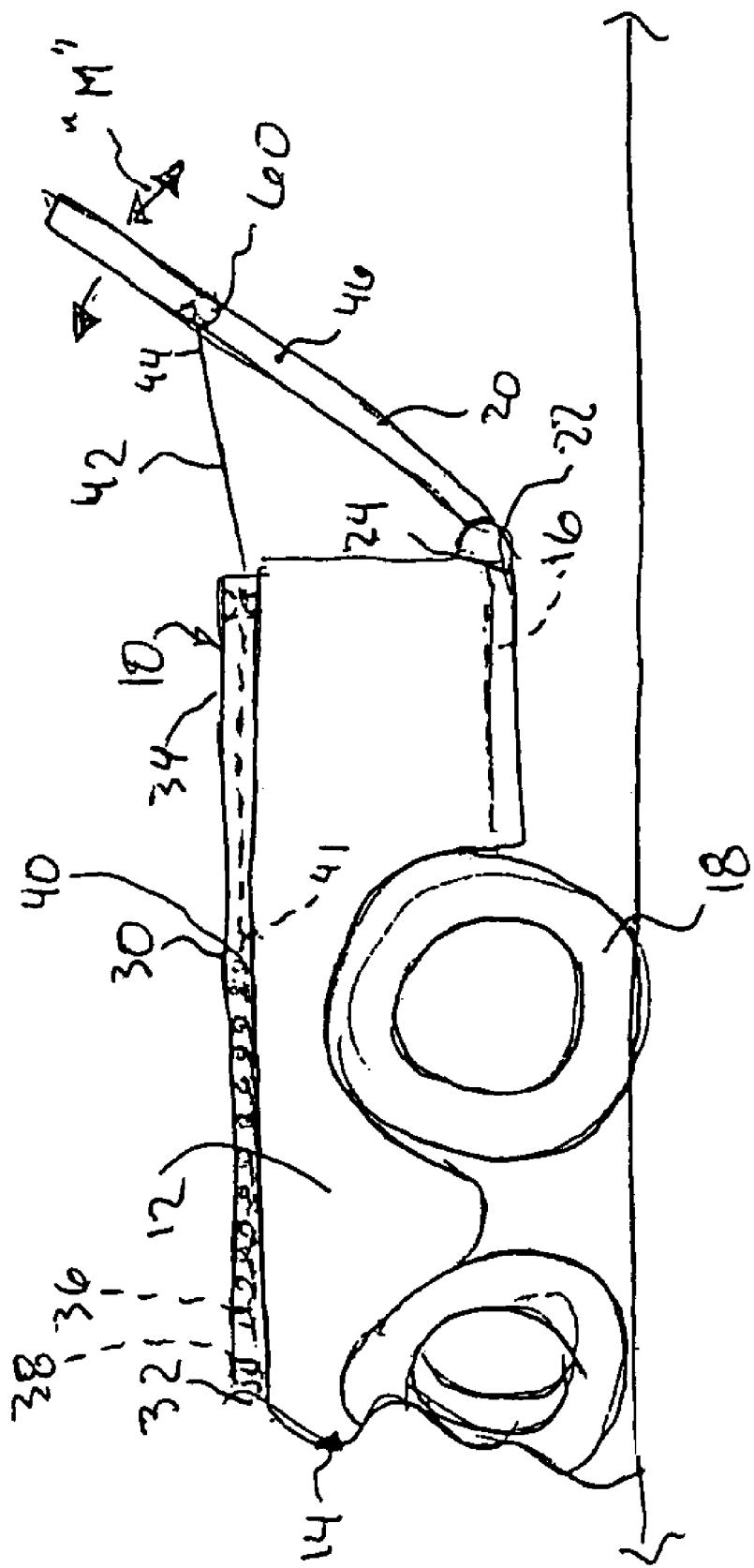
FIG. 1 is a side elevational view of a rearward portion of a utility trailer with a tailgate in a rearwardly tilted relationship thereto.

Referring now to the drawings in detail, and particularly to FIG. 1, there is shown the present invention which comprises a tailgate lift assembly 10 arranged on the bed, low side rails or walls 12 of a utility trailer 14. The utility trailer 14, by definition, has a flatbed 16, at least one set of wheels 18, and a tailgate 20 having a hinge 22 attached to the back end 24 of the flatbed 16, which is tiltable from a lowered orientation into an upward orientation. The utility trailer 14 is typically pulled by a large vehicle such as a pickup truck or the like. The side rails 12 of a utility trailer 14 are typically no higher than about 36" high from the flatbed 16 of that trailer 14, and are identified as "low" siderails.

Figure 2:
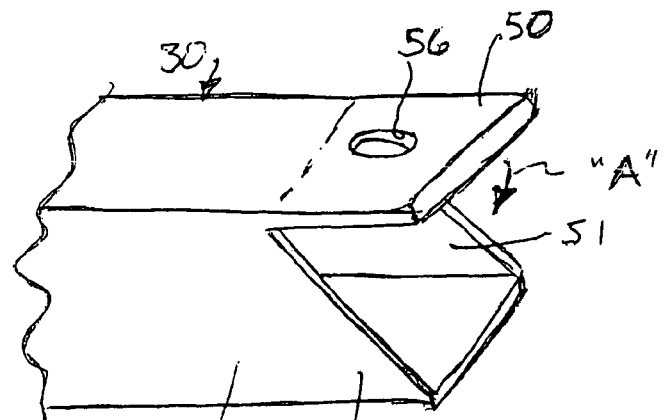
FIG. 2 is a perspective view of the rearward end of an elongated housing which would enclose a portion of the gate lift assembly.

The tailgate lift assembly 10 of the present invention comprises an elongated housing 30 having a forward end 32 and a rearward end 34. At least one elongated coiled spring 36 is arranged within that elongated housing 30. The elongated spring 36 has a forward end 38 which is fixedly secured to the forward end 32 of the elongated housing 30. The elongated spring 36 has rearward end 40 which is attached to the forward end 41 of a flexible cable 42. The flexible cable 42 has a rearward end 44 which is attached to a portion 46 of the pivotable tailgate 20 which itself is hingedly attached to the rearward end 24 of the utility trailer 14. The elongated housing 30 may for safety purposes in a preferred embodiment comprise an elongated enclosure and be extruded or formed from a metal, fiberglass or plastic, and is represented in FIG. 2 prior to a final forming operation of a back wall 50 thereon, as represented by the arrow "A".

Figure 3:
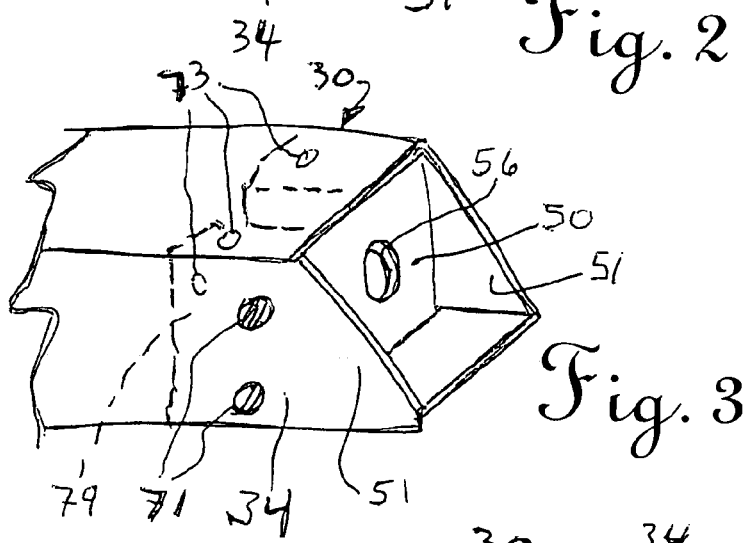
FIG. 3 is a view similar to FIG. 2, showing an end plate in its functional orientation at the rearward end of that elongated enclosure housing.
Figure 4:
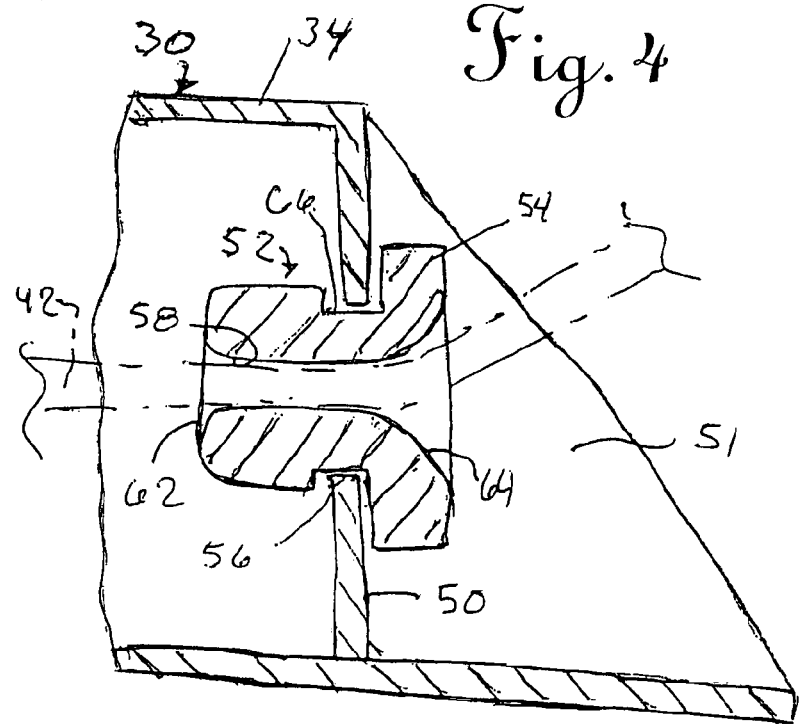
FIG. 4 is a side elevational view in section of the rearward end of the elongated enclosure housing with an insert or grommet extending therethrough to function as a cable guide therein.

The rearward end 34 of the elongated housing 30 has a side-reinforced back wall 50, as is shown in FIG. 3. The back wall 50 may be welded or adhesively secured to a pair of generally triangularly shaped reinforcing side walls 51, as shown in FIGS. 2,3, and 4. The back wall 50 is arranged to removably receive a cable-encircling guide member or insert 52 arranged and removably supported therewithin, as shown in FIG. 4. The guide member 52 of the present invention in a first embodiment thereof comprises a generally torroidally shaped insert or grommet 54 made from a slippery or lubricious material such as for example, teflon, nylon, copper or the like. The annular insert 54 is supported within an opening 56 in the reinforced back wall 50 of the elongated housing 30. The cable 42 extends through a bore 58 of the insert 54, the cable's rearward end 44 being aft ached to a connective link 60 on the portion 46 of the tailgate 20 to permit articulation between the cable 42 and the tailgate 20 as the tailgate is moved from a from a generally horizontal, or lowermost orientation to a vertical orientation with respect to the rear end 24 of the utility trailer 14, as represented by the arrow "M" in FIG. 1.

In a first preferred embodiment of the elongated housing 30, such elongated housing 30 may be made by an extrusion process. The back wall member 50 preferably extends perpendicular to the longitudinal axis of the housing 30.

The insert or grommet 52 is preferably of generally cylindrical configuration having its central bore 58 therethrough and a curved upstream end 62 and a curved rearward end 64 to minimize wearing of the cable 42 as it goes through its arcuate motion when the gate 20 is lifted upwardly or downwardly. The insert or grommet 52 has an annular channel 66 which receives the wall portion of the opening 56 of the rear wall 50 at one end of the elongated housing 30. This securely retains or captures the insert 52 in place and prevents it from moving freely in the longitudinal direction as the cable 42 moves during raising or lowering of the tailgate 20. As shown in FIG. 4, a first end of the insert 52 is oversized relative to the opening 56 and extends inside the housing 30. A second end of the insert 52 is also oversized relative to the opening 56 extends outside the longitudinal housing 30. Replacement of a worn or broken insert is easily accomplished by a simple removal and pressed reinsertion of a new insert into the hole 56 in the back wall 50 of the elongated housing 30.

Figure 5:
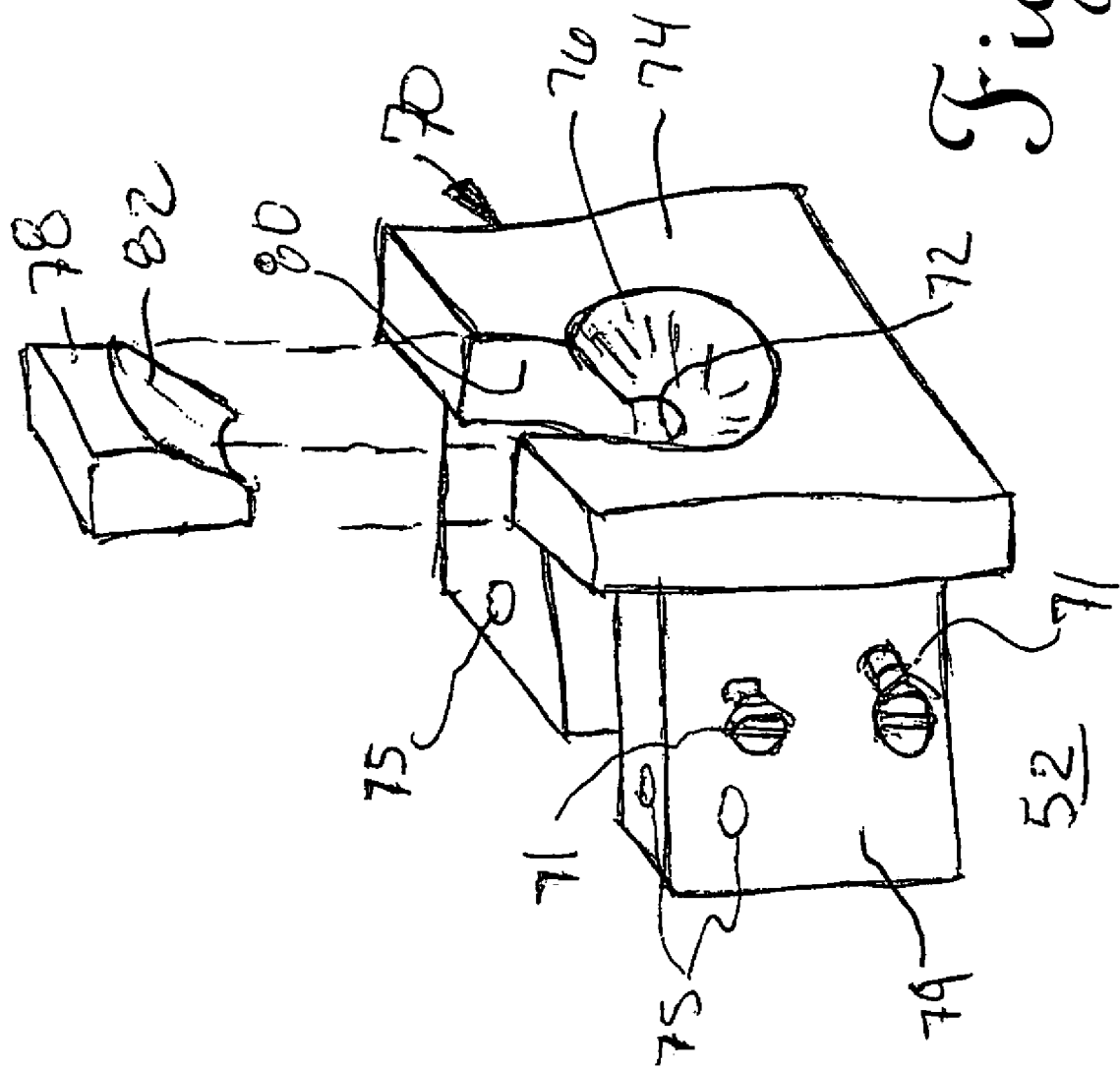
FIG. 5 is a perspective view of a further embodiment of the cable guide assembly utilized for guiding the cable at the rearward end of the enclosure housing.

A further embodiment of the replacement guide member 54 comprises a generally square, circular, rectilinear or multi-piece member 70 having a bore or channel 72 extending longitudinally therethrough, as may be seen in FIG. 5. The rearwardmost side 74 of the member 70 adjacent the bore 72 preferably has an arcuate curve or scive 76 therearound. An upper portion of the rearmost side 74 of the insert has an insertable component 78 which mates into a tapered receiving slot 80 of the member 70. The insertable component 78 has a tapered or scived edge 82 which is in circumferential alignment with the scived edge 76 of the rearward face 74 of the replacement member 70. After installation of a cable 42 through the longitudinal channel 72, the insertable component 78 may be pressed into engagement with the tapered receiving slot 80 of the reinstallation member 70. The reinstallation member 70 may then be inserted into the opening 56 in the rear wall 50 at the rearward end 34 of the elongated housing 30.

The re-installation member 70 may itself comprise the rear wall 50 in a further preferred embodiment, and be secured to the rear portion 34 of the housing 30 by side bolts or screw securement members 71 or the like, in a placement for those securement members 71 as represented in FIG. 3, and shown in phantom as a further embodiment in FIG. 5. The member 70 may be secured into the rear end 34 of the housing 30 by detents 73 on the rear end of the housing 34 engaging depressions 75 in the member 70, which are represented also in FIG. 5. Such an arrangement of insertable components permits ready replacement of the cable 42 within that re-installation member 70 without requiring disassembling the cable, chain or pivotable components 60 at the rearward most end of the cable 42.

Figure 6:
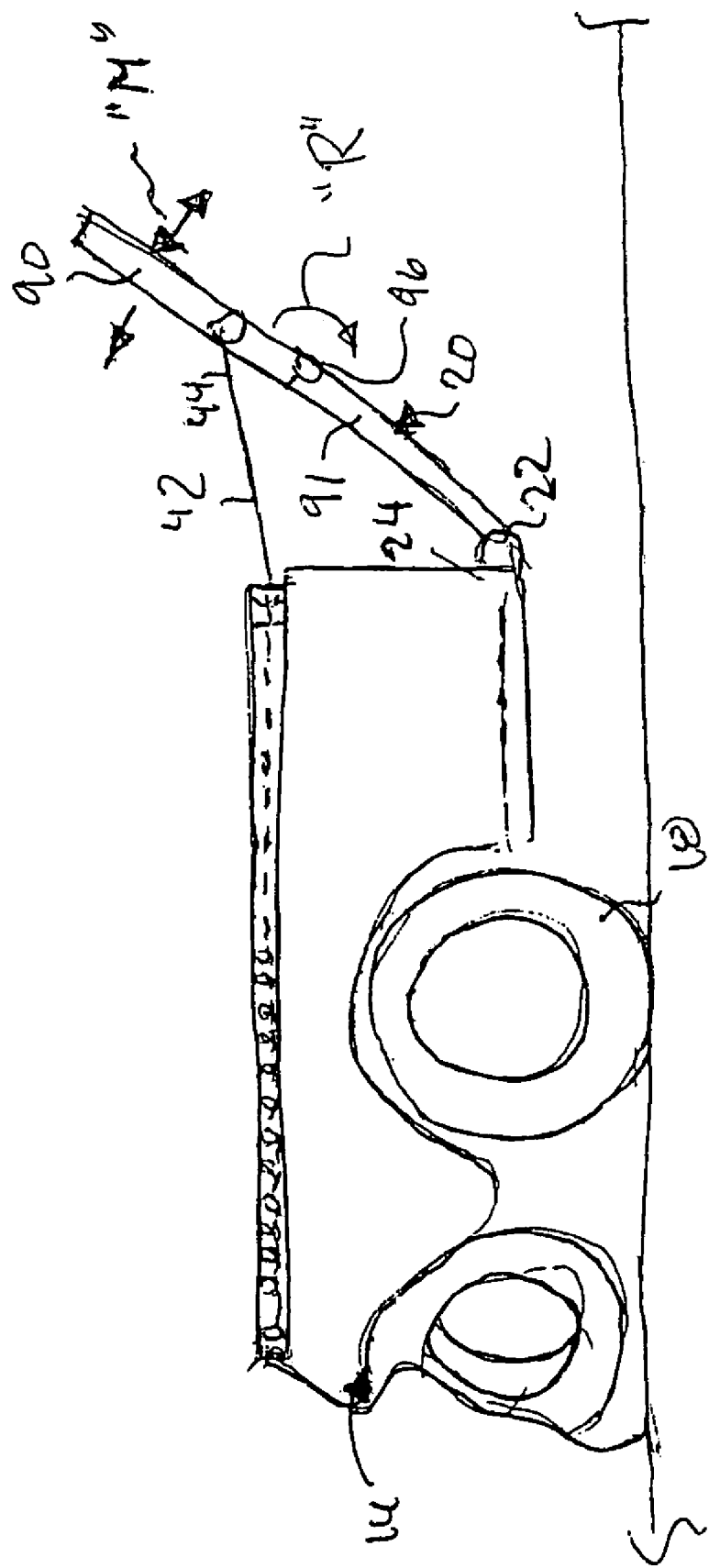
FIG. 6 is a side elevational view of a utility trailer having a second hinge arrangement thereon and utilizing the gate lift assembly therewith.

A further embodiment of the present invention contemplates the rearward end 44 of flexible cable 42 being attached preferably to the rearwardmost half portion 90 of the pivotable tailgate 20. The tailgate 20 itself would be hingedly transversely divided and have a hinge 96 at a location closer to the hinge 22 to which it is attached to the utility trailer 14 so tat when the tailgate 20 is moved into its vertical or upright orientation, the rearward or distalmost half 90 of the tailgate or ramp 20 may be pivoted and folded about its midpoint hinge 96, as indicated by arrow "R" in FIG. 6, to minimize wind resistance and increase visibility rearward of the wailer 14 by the folding of that backward half 90 of the ramp or tailgate 20 against the forward half 91 of the tailgate 20 while still having the cable 42 pulling against the now folded gate 20 against the rearward end of the side rails 12 on the utility trailer 14.

Thus what has been shown is a unique tailgate lift assembly which permits an inexpensive exchange of components in a facile manner while permitting safe usage of that tailgate assembly on a utility trailer. That present invention also eliminates the need for disassembly of that elongated cable and permits it to still be attached to the tailgate 20 and maintain its attachment to the tailgate or ramp 20 while the guide means 52 at the rearward end 34 of the elongated housing 30 is replaced.

The insertable member 78 of the guide member 70 may be tapered or it may have parallel side walls and its body 79, preferably of rectilinear shape, may fit inside the rear portion 34 of the housing 30 in its rectilinear configuration, and attached thereto by the securement members 71.

I claim:

1. A lift assembly for assisting in raising or lowering a tailgate, comprising:
    a housing having a sidewall extending in a longitudinal direction with an end wall extending transverse to the sidewall, said end wall having an opening adjacent the tailgate;
    a spring positioned within the housing;
    a cable extending between the spring and the tailgate, including through the opening in the end wall; and
    an insert for receiving the cable passing through the opening, the insert being securely retained by the end wall and prevented from moving freely in the longitudinal direction as the cable moves to and from during raising and lowering of the tailgate, wherein the insert is formed of a lubricious material relative to the cable.

2. The lift assembly according to claim 1, wherein the endwall has first and second sides and the insert includes an oversized first end projecting from a first side of the end wall and an oversized second end projecting from a second side of the end wall.

3. The lift assembly according to claim 1, wherein the insert includes an outer channel for receiving a portion of the housing adjacent the opening, whereby the portion of the housing in the channel helps to capture the insert and prevent free movement in the longitudinal direction.

4. The lift assembly according to claim 3, wherein the channel is annular.

5. The lift assembly according to claim 1, wherein the insert includes a passage having a curved surface at one end for facilitating movement of the cable in a vertical direction during lifting or lowering of the tailgate.

6. The lift assembly according to claim 1, wherein the insert comprises nylon.

7. The lift assembly according to claim 1, wherein the housing comprises a tubular body.

8. The lift assembly according to claim 1, wherein the end wall is secured to the housing using removable fasteners.

9. The lift assembly according to claim 1, wherein the end wall and the housing are formed from a single piece of material.

10. A lift assembly for assisting in raising or lowering a tailgate, comprising:
    a longitudinal housing including a wall having an opening;
    a spring positioned within the housing;
    a cable extending between the spring and the tailgate, including through the opening in the housing; and
    an insert for receiving the cable and including a first end oversized relative to the opening for assisting in guiding a first portion of the cable extending to the spring and a second end oversized relative to the opening for assisting in guiding a second portion of the cable extending to the tailgate.

11. The lift assembly of claim 10, wherein the insert includes a curved surface adjacent the first end.

12. The lift assembly of claim 10, wherein the insert includes a curved surface adjacent the second end.

13. The lift assembly of claim 10, further including a channel between the first and second ends of the insert for receiving the wail adjacent the opening.

14. A lift assembly for assisting in raising or lowering a tailgate, comprising:
  a housing extending in a longitudinal direction with an end wall having an opening adjacent the tailgate;
  a spring positioned within the housing;
  a cable extending between the spring and the tailgate, including through the opening in the end wall; and
  an insert for receiving the cable passing through the opening and securely retained by the end wall and prevented from moving freely in the longitudinal direction as the cable moves to and from during raising and lowering of the tailgate,
  wherein the insert includes an outer annular channel for receiving a portion of the housing adjacent the opening, whereby the portion of the housing in the channel helps to capture the insert and prevent free movement in the longitudinal direction.

15. A method for facilitating the raising or lowering of a tailgate, comprising:
  providing a longitudinal housing including an end wall having an opening adjacent the tailgate;
  extending a cable between a spring in the housing and the tailgate, including through the opening in the end wall; and
  providing an insert for receiving the cable through the opening and having a channel, the insert being securely retained by the end wall by placing the insert within the opening such that a portion of the end wall adjacent the opening is received in the channel, whereby the insert is prevented from moving freely in the longitudinal direction as the cable moves during raising and lowering of the tailgate.

16. The lift assembly according to claim 1, wherein the spring is fixedly secured at one end to the housing.

17. A lift assembly for assisting in raising or lowering a tailgate, comprising:
  a housing having a sidewall extending in a longitudinal direction with an end wall extending transverse to the sidewall, said end wall having an opening adjacent the tailgate;
  a spring positioned within the housing;
  a cable extending between the spring and the tailgate, including through the opening in the end wall; and
  an insert for receiving the cable passing through the opening, the insert being securely retained by the end wall and prevented from moving freely in the longitudinal direction as the cable moves to and from during raising and lowering of die tailgate, wherein the end wall is secured to the housing using removable fasteners.

* * * * *

UNITED STATES PATENT AND TRADEMARK OFFICE
CERTIFICATE OF CORRECTION

| | |
|---|---|
| PATENT NO. | : 7,309,094 B2 |
| APPLICATION NO. | : 11/050189 |
| DATED | : December 18, 2007 |
| INVENTOR(S) | : Norfleet |

Page 1 of 1

It is certified that error appears in the above-identified patent and that said Letters Patent is hereby corrected as shown below:

Column 7, claim 13, line 5, change "wail" to --wall--.

Column 8, claim 17, line 24, change "die" to --the--.

Signed and Sealed this

Twenty-ninth Day of April, 2008

JON W. DUDAS
*Director of the United States Patent and Trademark Office*